US007219535B2

(12) United States Patent
Hosoya

(10) Patent No.: US 7,219,535 B2

(45) Date of Patent: May 22, 2007

(54) LEAKAGE DIAGNOSIS APPARATUS FOR FUEL VAPOR PURGE SYSTEM AND METHOD THEREOF

(75) Inventor: Hajime Hosoya, Atsugi (JP)

(73) Assignee: Hitachi, Ltd., Tokyo-to (JP)

( * ) Notice: Subject to any disclaimer, the term of this patent is extended or adjusted under 35 U.S.C. 154(b) by 137 days.

(21) Appl. No.: 10/851,139

(22) Filed: May 24, 2004

(65) Prior Publication Data

US 2005/0000273 A1 Jan. 6, 2005

(30) Foreign Application Priority Data

May 29, 2003 (JP) ............................ 2003-152293

(51) Int. Cl.
*G01M 3/26* (2006.01)

(52) U.S. Cl. ........................................ 73/49.7; 73/49.2

(58) Field of Classification Search ................. 73/49.7, 73/49.2, 40, 40.7
See application file for complete search history.

(56) References Cited

U.S. PATENT DOCUMENTS 5,146,902 A * 9/1992 Cook et al. ................. 123/518
5,575,265 A * 11/1996 Kurihara et al. ............ 123/520
6,082,337 A * 7/2000 Fujimoto et al. ........... 123/520
6,321,727 B1 * 11/2001 Reddy et al. ............... 123/520
6,357,288 B1 * 3/2002 Shigihama et al. ........ 73/118.1
6,389,882 B1 * 5/2002 Ohkuma ..................... 73/49.7
6,698,280 B1 * 3/2004 Iden et al. ................. 73/118.1
6,966,214 B2 * 11/2005 Watanabe et al. ............ 73/49.2

FOREIGN PATENT DOCUMENTS

JP 11-343927 A 12/1999

* cited by examiner

*Primary Examiner*—Hezron Williams
*Assistant Examiner*—Ryan Christensen
(74) *Attorney, Agent, or Firm*—Foley & Lardner LLP

(57) ABSTRACT

In a fuel vapor purge system, a blocked diagnosis zone is pressurized by an air pump, a pressure in the diagnosis zone at the time when the diagnosis zone is pressurized, and an occurrence of leakage in the diagnosis zone is judged based on the comparison between a curvature of a change curve of the pressure and a threshold.

21 Claims, 5 Drawing Sheets

LEAKAGE DIAGNOSIS APPARATUS FOR FUEL VAPOR PURGE SYSTEM AND METHOD THEREOF

FIELD OF THE INVENTION

The present invention relates to a leakage diagnosis apparatus for a fuel vapor purge system used in a vehicle installed internal combustion engine, and a method thereof.

RELATED ART

The above described fuel vapor purge system has a configuration in which fuel vapor generated in a fuel tank is trapped in a canister, and the fuel vapor trapped in the canister is purged into an intake passage of an internal combustion engine.

Japanese Unexamined Patent Publication No. 11-343927 discloses an apparatus for diagnosing an occurrence of leakage in the fuel vapor purge system.

In this diagnosis apparatus, a zone in which a leakage occurrence is to be diagnosed is blocked, and also an intake negative pressure of an internal combustion engine is introduced into the blocked diagnosis zone, to diagnose the occurrence of leakage based on a pressure change amount in the diagnosis zone due to the introduction of the negative pressure.

However, if the fuel vapor is generated in the fuel tank contained in the diagnosis zone when the pressure in the diagnosis zone is reduced with the intake negative pressure of the engine, the pressure change amount is changed. Therefore, in the diagnosis based on the pressure change amount, there has been a problem in that it is impossible to diagnose with high accuracy the existence of a leak hole having a small diameter.

SUMMARY OF THE INVENTION

The present invention has an object to provide a leakage diagnosis apparatus and a method thereof, capable of diagnosing with high accuracy the existence of a leak hole having a small diameter, even if fuel vapor is generated in a fuel tank during the diagnosis.

In order to achieve the above object, the present invention has a configuration in which a pressure of a blocked diagnosis zone is changed using an external pressure generating source, and a curvature of pressure change curve at that time is calculated, to diagnose an occurrence of leakage in the diagnosis zone based on the comparison between the curvature and a threshold.

The other objects and features of this invention will become understood from the following description with reference to the accompanying drawings.

DESCRIPTION OF EMBODIMENTS

Figure 1:
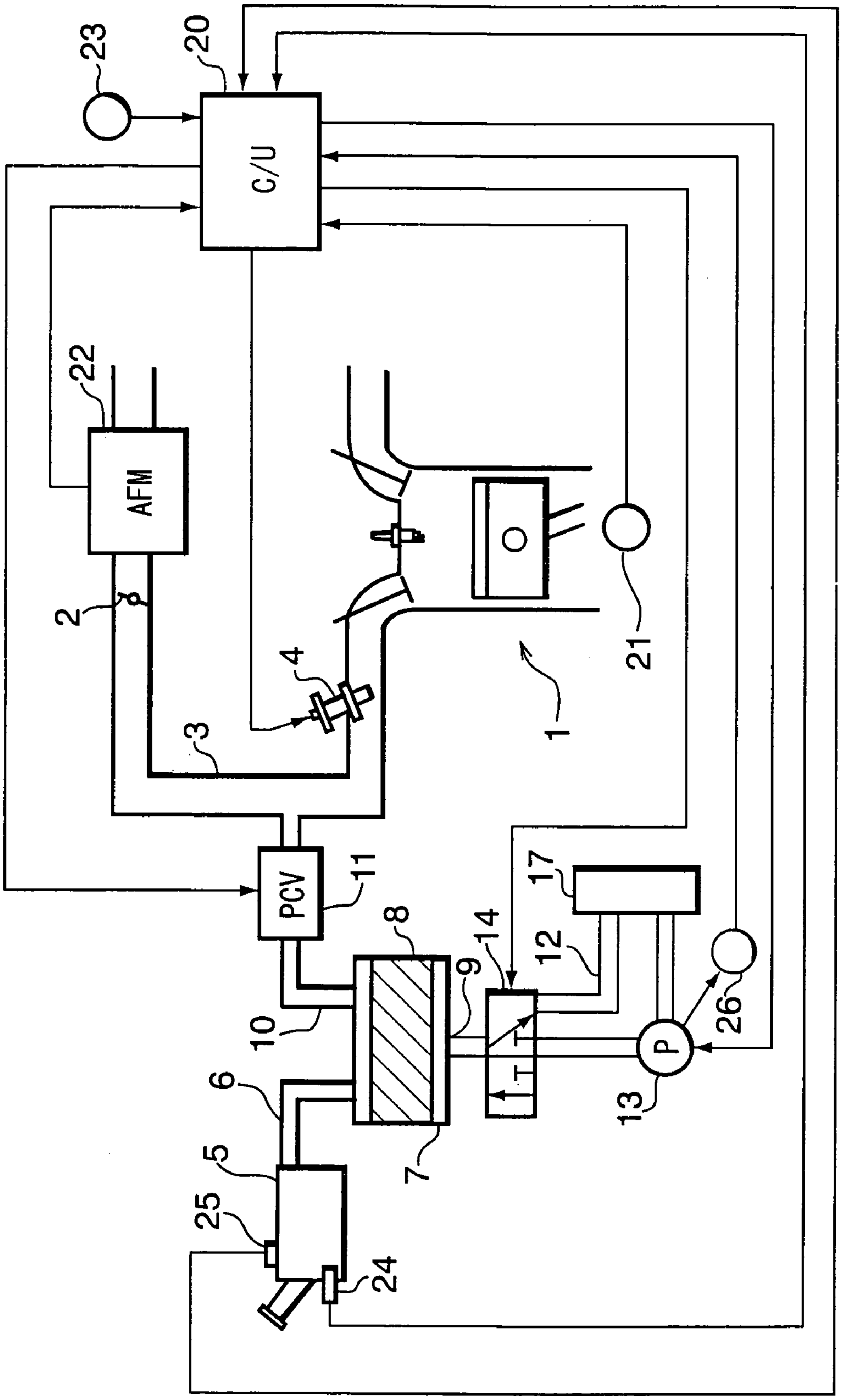
FIG. 1 is a diagram showing a system configuration of an internal combustion engine in an embodiment.

FIG. 1 is a diagram showing a system configuration of an internal combustion engine in an embodiment.

In FIG. 1, an internal combustion engine 1 is a gasoline engine installed in a vehicle (not shown in the figure).

A throttle valve 2 is disposed in an intake system of internal combustion engine 1.

An intake air amount of engine 1 is controlled according to an opening of throttle valve 2.

For each cylinder, an electromagnetic type fuel injection valve 4 is disposed in a manifold portion of an intake passage 3 on the downstream side of throttle valve 2.

Fuel injection valve 4 is opened based on an injection pulse signal which is output from a control unit 20 in synchronism with an engine rotation, to inject fuel.

A canister 7, into which fuel vapor generated in a fuel tank 5 is introduced via an evaporation passage 6, is provided as a fuel vapor purge system.

Canister 7 is a container filled with the adsorbent 8 such as activated carbon.

Further, a new air inlet 9 is formed to canister 7, and a purge passage 10 is extended out from the canister.

Purge passage 10 is connected to intake passage 3 on the downstream side of throttle valve 2.

A closed type purge control valve 11 is disposed in the halfway of purge passage 10.

An opening of purge control valve 11 is controlled based on a purge control signal output from control unit 20.

The fuel vapor generated in fuel tank 5 is introduced by evaporation passage 6 into canister 7, to be adsorptively trapped in canister 7.

When a predetermined purge permission condition is established during an operation of engine 1, purge control valve 11 is controlled to open.

Then, as a result that an intake negative pressure of engine 1 acts on canister 7, the fuel vapor adsorbed in canister 7 is purged by the fresh air introduced through new air inlet 9.

Purged gas inclusive of the purged fuel vapor passes through purge passage 10 to be sucked in intake passage 3.

In order to diagnose an occurrence of leakage in the fuel vapor purge system, an electric-motor driven air pump 13 is disposed on the new air inlet 9 side of canister 7.

Further, there is disposed an electromagnetic type switching valve 14, which connects new air inlet 9 selectively to an outside-air communicating aperture 12 or a discharge opening of air pump 13.

Switching valve 14 connects new air inlet 9 to outside-air communicating aperture 12 in an OFF condition thereof, and to the discharge opening of air pump 13 in an ON condition thereof.

Further, there is disposed an air filter 17, which is common to outside-air communicating aperture 12 and a suction opening of air pump 13.

Control unit 20 incorporating therein a microcomputer, receives signals from various sensors.

As the various sensors, there are provided a crank angle sensor 21 outputting a crank angle signal, an air flow meter 22 detecting an intake air amount of engine 1, a vehicle speed sensor 23 detecting a running speed of the vehicle in which engine 1 is installed, a pressure sensor 24 detecting a gas pressure inside fuel tank 5, a fuel gauge 25 detecting a remaining fuel quantity in fuel tank 5, and a current sensor 26 detecting a current of air pump 13.

Control unit 20 controls fuel injection valve 4 and purge control valve 11 based on engine operating conditions detected by the various sensors.

Further, control unit 20 controls air pump 13 and switching valve 14, to diagnose an occurrence of leakage in the fuel vapor purge system.

Figure 2:
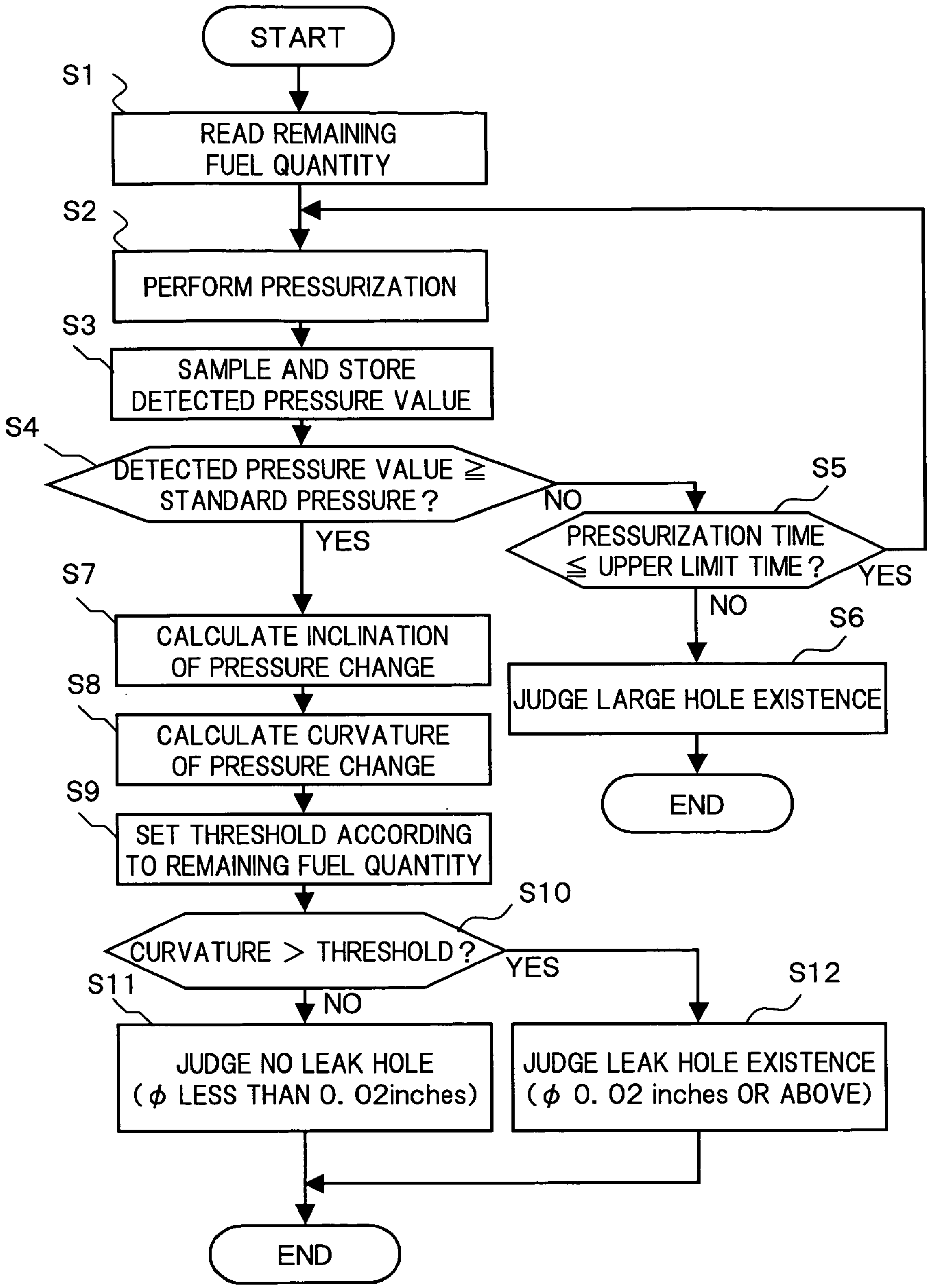
FIG. 2 is a flowchart showing the leak diagnosis in a first embodiment.

A flowchart of FIG. 2 shows the detail of leakage diagnosis.

In step S1, the remaining fuel quantity in fuel tank 5, which is detected by fuel gauge 25, is read.

In step S2, a diagnosis zone, which contains purge passage 10 on the downstream side of purge control valve 11, canister 7, evaporation passage 6 and fuel tank 5, is blocked, and the blocked diagnosis zone is pressurized by air pump 13.

Namely, after purge control valve 11 is controlled to close, and switching valve 14 is turned to the ON condition, air pump 13 is driven, so that the air discharged from air pump 13 is fed into the blocked diagnosis zone.

In step S3, the pressure in fuel tank 5 detected by pressure sensor 24 is read to be stored sequentially.

In step S4, it is judged whether or not the pressure in fuel tank 5 reaches a standard pressure or above.

If the pressure in fuel tank 5 (the diagnosis zone) does not reach the standard pressure or above, control proceeds to step S5.

In step S5, it is judged whether or not a pressurization time being an elapsed time after the pressurization of diagnosis zone has been started by air pump 13, is equal to or less than a previously stored upper limit time.

If it is judged in step S5 that the pressurization time is less than or equal to the upper limit time, control returns to step S2. In contrast, if it is judged in step S5 that the pressurization time exceeds the upper limit time, it is judged that the pressure in the diagnosis zone did not reach the standard pressure within the upper limit time, since gas of a predetermined amount or above is leaked out from the diagnosis zone.

When it is judged in step S5 that the pressurization time exceeds the upper limit time, control proceeds to step S6. In step S6, a diagnosis signal indicating that a large leak hole having a diameter of reference diameter (for example, 0.04 inches in diameter) or above, exists in the diagnosis zone.

On the other hand, if, in step S4, the pressure in the diagnosis zone reaches the standard pressure or above within the upper limit time, control proceeds to step S7.

In step S7, an inclination of a pressure change curve in the diagnosis zone (pressure change speed) is calculated.

The inclination of the pressure change curve (pressure change speed) is obtained as a pressure change amount in a fixed short time.

In step S8, a curvature of the pressure change curve in the diagnosis zone (curvature=absolute value of pressure change acceleration) is calculated.

In step S9, a threshold to be compared with the curvature is set based on the remaining fuel quantity in fuel tank 5.

This is because space volume of the pressurized diagnosis zone is changed depending on the remaining fuel quantity, and the curvature is changed due to the change in the space volume.

The more the remaining fuel quantity is, in other words, the smaller the space volume of the diagnosis zone is, the threshold is set to a larger value.

In step S10, the curvature obtained in step S8 and the threshold set in step S9 are compared with each other.

Then, when it is judged in step S10 that the curvature is equal to or less than the threshold, in other words, in the case where the pressure in fuel tank 5 is increasingly changed at a substantially fixed speed, control proceeds to step S11.

In step S11, the diagnosis signal indicating that there is no leak hole, is output.

A diagnosis result of no leak hole shows a diagnosis result indicating that there is no leak hole, or, even if there is a leak hole, such a leak hole has a diameter smaller than a permissible reference minor diameter (0.02 inches in diameter).

On the other hand, when it is judged, in step S10, that the curvature exceeds the threshold, that is, in the case where a speed of pressure rise by the pressurization shows a tendency to be decreased gradually, control proceeds to step S12.

In step S12, the diagnosis signal indicating that there exists a leak hole of 0.02 inches or above in diameter, is output.

Figure 3:
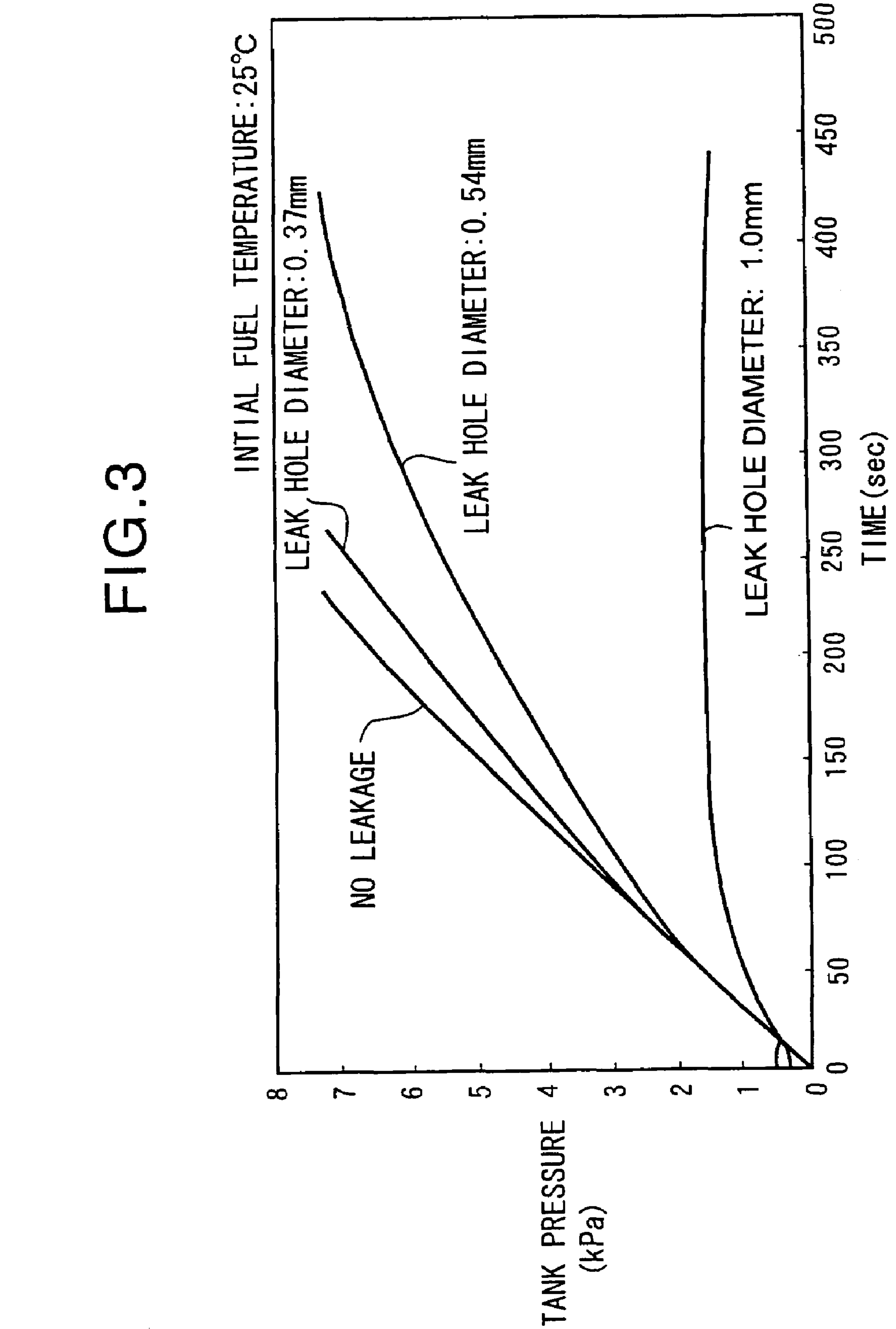
FIG. 3 is a graph showing a correlation between a pressure change for when a fuel temperature is 25° C., and a leak hole diameter.

FIG. 3 is a graph showing the pressure changes for when the pressurization by air pump 13 is performed under a condition that the fuel temperature is 25° C. and the remaining fuel quantity is 10 liters, for the cases of no leak hole, the leak hole of 0.37 mm in diameter, the leak hole of 0.54 mm in diameter, and the leak hole of 1.0 mm in diameter.

As shown in FIG. 3, in the case of no leak hole, the pressure in the diagnosis zone rises at the substantially fixed speed. However, the larger the leak hole diameter becomes, the pressure rise speed in the diagnosis zone is decreased, and in the case of the leak hole of 1.0 mm in diameter, the pressure in the diagnosis zone slightly rises, and thereafter, becomes substantially fixed.

Accordingly, it is possible to judge whether or not there exists a large leak hole having a diameter exceeding 1.0 mm, based on whether or not the pressure in the diagnosis zone exceeds the standard pressure (for example, 2 kPa in the example of FIG. 3).

On the other hand, in the case where the leak hole diameter is small, and accordingly, the pressure in the diagnosis zone exceeds the standard pressure, an occurrence of leakage is judged using the curvature of the pressure change curve.

Namely, the pressure in the diagnosis zone rises at the substantially fixed speed in the case of no leak hole, while the speed of pressure rise in the diagnosis zone is gradually decreased in the case where there exists a leak hole, and furthermore, the drop of pressure rise speed becomes larger, as the leak hole diameter becomes larger.

Therefore, in the present embodiment, the existence of leak hole having a diameter smaller than 1.0 mm (0.4 inches) is judged based on the curvature of the pressure change curve (acceleration of the pressure change).

Figure 4:
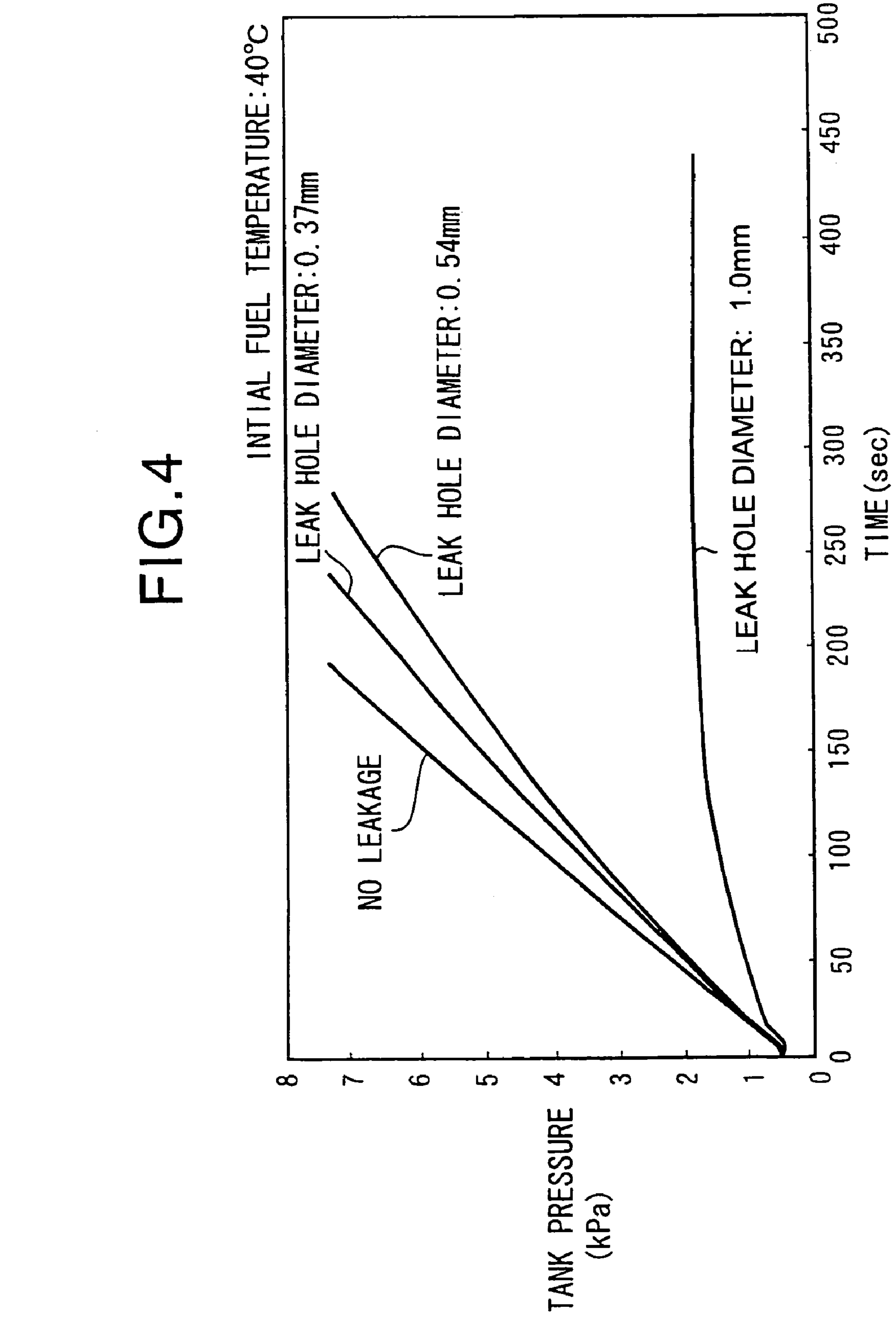
FIG. 4 is a graph showing a correlation between a pressure change for when the fuel temperature is 40° C., and the leak hole diameter.

Here, the pressure change in the diagnosis zone is influenced by the fuel vapor. However, as is apparent from the comparison between the pressure change at the fuel temperature of 25° C. shown in FIG. 3 and the pressure change at the fuel temperature of 40° C. shown in FIG. 4, the curvature of the pressure change curve is hardly to be influenced by the fuel vapor in comparison with the pressure change amount.

Accordingly, in the leakage diagnosis based on the curvature of the pressure change curve, the diagnosis accuracy is not significantly lowered due to the generation of fuel vapor, thereby enabling the accurate diagnosis of the existence of leak hole having a small diameter.

Incidentally, since a load of air pump 13 is changed according to the pressure in the diagnosis zone, by performing the leakage diagnosis based on a curvature of change curve of the load of air pump 13, it is possible to perform the diagnosis same as the diagnosis based on the curvature of the pressure change curve.

Figure 5:
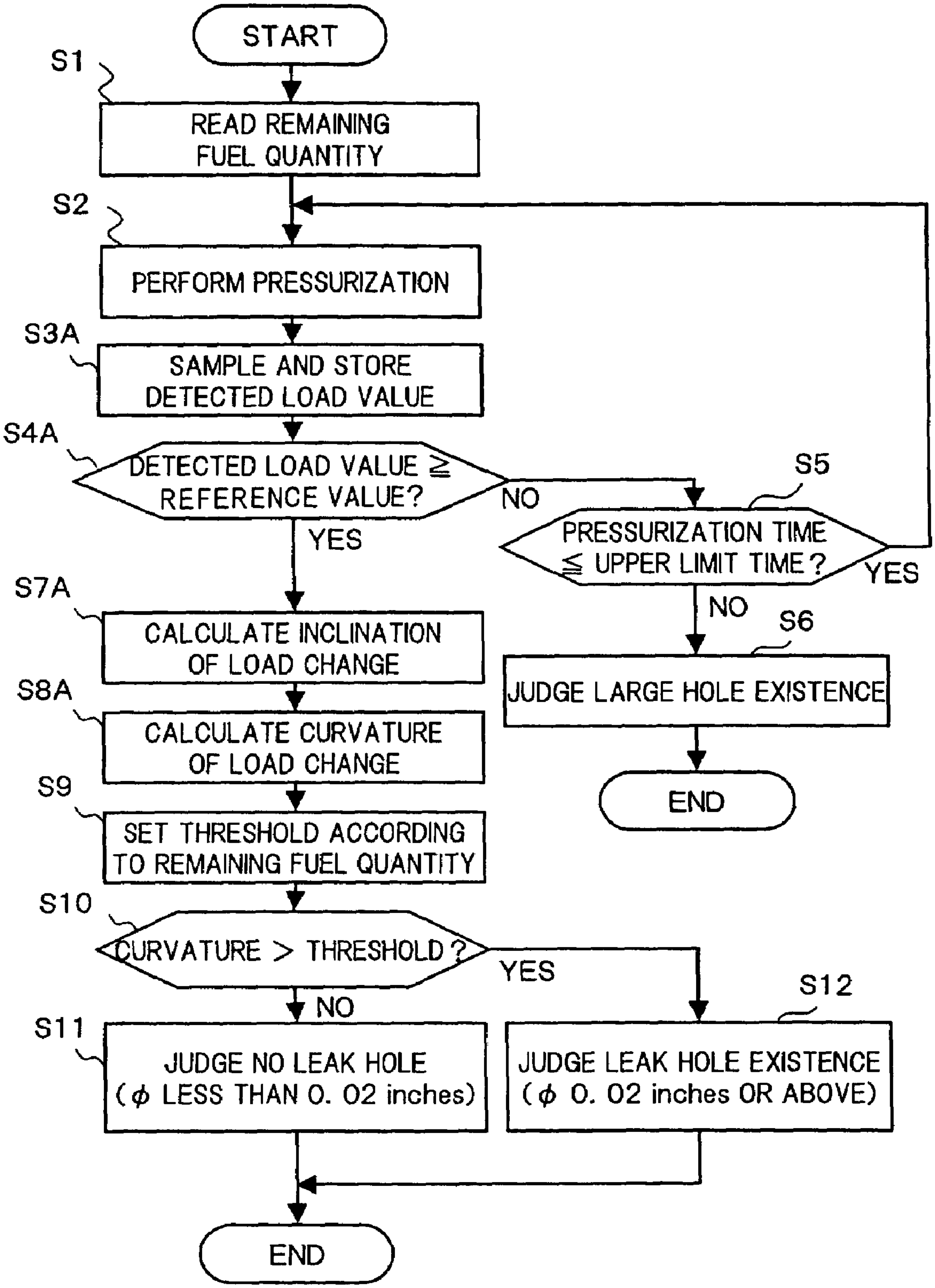
FIG. 5 is a flowchart showing the leak diagnosis in a second embodiment.

A flowchart of FIG. 5 shows a second embodiment in which the leakage diagnosis is performed based on the load of air pump 13.

The flowchart of FIG. 5 differs from the flowchart of FIG. 2 only in step S3A, step S4A, step S7A, and step S8A.

In the flowchart of FIG. 5, the load of air pump 13 is used as data equivalent to the pressure in fuel tank 5 (pressure in the diagnosis zone).

In step S3A, the current detected by current sensor 26, being data indicating the load of air pump 13, is read to be stored.

In step S4A, it is judged whether or not the current (load) reaches a reference value or above.

Then, if the current (load) of air pump 13 reaches the reference value or above in the pressurization time within the upper limit time, control proceeds to step S7A, where an inclination of the current (load) change curve (current change speed) is calculated.

Further, in step S8A, the curvature of the current (load) change curve (acceleration of the current change) is calculated.

Then, in step S10, the threshold according to the remaining fuel quantity and the curvature obtained in step S8A (absolute value of the acceleration of the current change) are compared with each other, to diagnose whether or not there exists a leak hole having a diameter of 0.02 inches or above.

According to the second embodiment, the leakage diagnosis can be performed without using pressure sensor 24.

In the above embodiment, the current of air pump 13 has been used as the data indicating the load of air pump 13. However, the configuration may be such that a control signal for air pump 13, for when air pump 13 is feedback controlled based on the pressure in the diagnosis zone, is used as the data indicating the load of air pump 13.

Further, in the above embodiment, the diagnosis zone has been pressurized by air pump 13. However, the configuration may be such that the pressure in the diagnosis zone is reduced by air pump 13.

Furthermore, the configuration may be such that the outside-air communicating aperture of canister 7 is blocked during the operation of engine 1, and also purge control valve 11 is opened, to introduce the intake negative pressure of the engine into the diagnosis zone, thereby reducing the pressure in the diagnosis zone.

In the case where the pressure in the diagnosis zone is reduced, the leakage diagnosis is performed based on the curvature of the pressure change curve for when the pressure in the diagnosis zone is decreasingly changed.

The entire contents of Japanese Patent Application No. 2003-152293 filed on May 29, 2003, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined in the appended claims and their equivalents.

What is claimed is:

1. A leakage diagnosis apparatus for a fuel vapor purge system, in which fuel vapor generated in a fuel tank is trapped in a canister via an evaporation passage, and the fuel vapor trapped in said canister is purged, via a purge passage, into an intake passage of an internal combustion engine, comprising:

a blocking device arranged for blocking a diagnosis zone containing at least one of said fuel tank, said evaporation passage, said canister and said purge passage;

a pressure generator arranged for changing a pressure in said diagnosis zone;

a pressure detector arranged for detecting the pressure in said diagnosis zone;

a remaining quantity detector detecting a remaining fuel quantity in said fuel tank; and a diagnosis unit that blocks said diagnosis zone by said blocking device to change the pressure in said blocked diagnosis zone by said pressure generator, and diagnoses an occurrence of leakage in said diagnosis zone based on the pressure detected by said pressure detector, wherein said diagnosis unit calculates a pressure change acceleration based on the pressure detected by said pressure detector, and diagnoses, when said pressure change acceleration is greater than a threshold, an occurrence of leakage, and wherein said diagnosis unit sets said threshold according to the remaining fuel quantity in said fuel tank when the fuel tank is contained in said diagnosis zone.

2. A leakage diagnosis apparatus for a fuel vapor purge system according to claim 1, wherein said diagnosis unit sets said threshold to a larger value as the remaining fuel quantity is large.

3. A leakage diagnosis apparatus for a fuel vapor purge system according to claim 1, wherein said pressure generator is an air pump.

4. A leakage diagnosis apparatus for a fuel vapor purge system according to claim 3, wherein said pressure detector detects the pressure in said diagnosis zone based on a load of said air pump.

5. A leakage diagnosis apparatus for a fuel vapor purge system according to claim 3, wherein said air pump pressurizes said diagnosis zone.

6. A leakage diagnosis apparatus for a fuel vapor purge system according to claim 3, wherein said air pump reduces the pressure in said diagnosis zone.

7. A leakage diagnosis apparatus for a fuel vapor purge system according to claim 1, wherein said internal combustion engine is used as said pressure generator, and an intake negative pressure of said internal combustion engine is introduced into said diagnosis zone to reduce the pressure in said diagnosis zone.

8. A leakage diagnosis apparatus for a fuel vapor purge system according to claim 1, wherein said pressure generator is an air pump, and wherein said blocking device:

(a) comprises a purge control valve disposed in said purge passage and a switching valve connecting a new air inlet of said canister to either the air pump or an outside air communicating aperture; and (b) blocks a zone containing said fuel tank, said evaporation passage, said canister and said purge passage on a downstream side of said purge control valve, as a diagnosis zone, by closing said purge control valve and also connecting the new air inlet of said canister to the air pump by said switching valve.

9. A leakage diagnosis apparatus for a fuel vapor purge system, in which fuel vapor generated in a fuel tank is trapped in a canister via an evaporation passage, and the fuel vapor trapped in said canister is purged, via a purge passage, into an intake passage of an internal combustion engine, comprising:

a blocking device blocking a diagnosis zone containing at least one of said fuel tank, said evaporation passage, said canister and said purge passage;

a pressure generator changing a pressure in said diagnosis zone;

a pressure detector detecting the pressure in said diagnosis zone; and a diagnosis unit that blocks said diagnosis zone by said blocking device to change the pressure in said blocked diagnosis zone by said pressure generator, and diagnoses an occurrence of leakage in said diagnosis zone based on the pressure detected by said pressure detector, wherein said diagnosis unit obtains a curvature of change curve of said pressure, and diagnoses an occurrence of leakage based on a comparison between said curvature and a threshold, and wherein, said diagnosis unit compares the pressure in said diagnosis zone with a predetermined pressure once a predetermined time elapses after a point in time at which the pressure starts to change, to determine: (a) an existence of a leak hole having a diameter equal to or above a reference diameter when the pressure in said diagnosis zone does not reach the predetermined pressure; and (b) an existence of a leak hole having a diameter less than the reference diameter, based on said curvature of the pressure change curve, when the pressure in said diagnosis zone reaches the predetermined pressure.

10. A leakage diagnosis apparatus for a fuel vapor purge system, in which fuel vapor generated in a fuel tank is trapped in a canister via an evaporation passage, and the fuel vapor trapped in said canister is purged, via a purge passage, into an intake passage of an internal combustion engine, comprising:

blocking means for blocking a diagnosis zone containing at least one of said fuel tank, said evaporation passage, said canister and said purge passage;

means for changing a pressure in said blocked diagnosis zone by an external pressure generating source;

means for detecting the pressure in said diagnosis zone;

means for calculating a pressure change acceleration in said diagnosis zone in a state where the pressure in said diagnosis zone is being changed by said external pressure generating source;

means for diagnosing an occurrence of leakage when said pressure change acceleration is greater than a threshold;

means for detecting a remaining fuel quantity in said fuel tank; and means for setting said threshold according to the remaining fuel quantity in said fuel tank when the fuel tank is contained in said diagnosis zone.

11. A leakage diagnosis method for a fuel vapor purge system, in which fuel vapor generated in a fuel tank is trapped in a canister via an evaporation passage, and the fuel vapor trapped in said canister is purged, via a purge passage, into an intake passage of an internal combustion engine, comprising the steps of:

blocking a diagnosis zone containing at least one of said fuel tank, said evaporation passage, said canister and said purge passage;

changing a pressure in said blocked diagnosis zone using an external pressure generating source;

detecting the pressure in said diagnosis zone;

calculating a pressure change acceleration in said diagnosis zone;

diagnosing an occurrence of leakage when said pressure change acceleration is greater than a threshold;

detecting a remaining fuel quantity in said fuel tank; and setting said threshold according to the remaining fuel quantity in said fuel tanks, wherein said step of blocking the diagnosis zone blocks said diagnosis zone containing said fuel tank.

12. A leakage diagnosis method for a fuel vapor purge system according to claim 11, wherein said step of setting the threshold sets said threshold to a larger value as the remaining fuel quantity is large.

13. A leakage diagnosis method for a fuel vapor purge system according to claim 11, wherein said step of changing the pressure in said diagnosis zone uses an air pump as said external pressure generating source.

14. A leakage diagnosis method for a fuel vapor purge system according to claim 13, wherein said step of detecting the pressure in said diagnosis zone detects the pressure in said diagnosis zone based on a load of said air pump.

15. A leakage diagnosis method for a fuel vapor purge system according to claim 13, wherein said step of changing the pressure in said diagnosis zone pressurizes said diagnosis zone using said air pump.

16. A leakage diagnosis method for a fuel vapor purge system according to claim 13, wherein said step of changing the pressure in said diagnosis zone reduces the pressure in said diagnosis zone using said air pump.

17. A leakage diagnosis method for a fuel vapor purge system according to claim 11, wherein said step of changing the pressure in said diagnosis zone uses said internal combustion engine as said external pressure generating source, and introduces an intake negative pressure of said internal combustion engine into said diagnosis zone to reduce the pressure in said diagnosis zone.

18. A leakage diagnosis method for a fuel vapor purge system according to claim 11, wherein said step of blocking the diagnosis zone comprises the steps of:

closing a purge control valve disposed in said purge passage; and connecting an air pump as the external pressure generating source to a new air inlet of said canister.

19. A leakage diagnosis method for a fuel vapor purge system, in which fuel vapor generated in a fuel tank is trapped in a canister via an evaporation passage, and the fuel vapor trapped in said canister is purged, via a purge passage, into an intake passage of an internal combustion engine, comprising the steps of:

blocking a diagnosis zone containing at least one of said fuel tank, said evaporation passage, said canister and said purge passage;

changing a pressure in said blocked diagnosis zone using an external pressure generating source;

detecting the pressure in said diagnosis zone;

calculating a curvature of a change curve of said detected pressure in said diagnosis zone; and diagnosing an occurrence of leakage based on a comparison of said curvature and a threshold, said step of diagnosing the occurrence of leakage comprising the steps of:

measuring an elapsed time after the pressure in said diagnosis zone starts to be changed using said external pressure generating source;

judging whether or not the pressure in said diagnosis zone reaches a predetermined pressure at a point of time when said elapsed time reaches a predetermined time;

judging an existence of a leak hole having a diameter equal to or above a reference diameter, when the pressure in said diagnosis zone does not reach said predetermined pressure;

calculating the curvature of the pressure change curve when the pressure in said diagnosis zone reaches said predetermined pressure; and judging whether or not there exists a leak hole having a diameter less than the reference diameter, based on said calculated curvature.

20. A leakage diagnosis apparatus for a fuel vapor purge system, in which fuel vapor generated in a fuel tank is trapped in a canister via an evaporation passage, and the fuel vapor trapped in said canister is purged, via a purge passage, into an intake passage of an internal combustion engine, comprising:

a blocking device arranged for blocking a diagnosis zone containing at least one of said fuel tank, said evaporation passage, said canister and said purge passage;

a pressure generator arranged for changing a pressure in said diagnosis zone;

a pressure detector arranged for detecting the pressure in said diagnosis zone; and a diagnosis unit that blocks said diagnosis zone by said blocking device to change the pressure in said blocked diagnosis zone by said pressure generator, and diagnoses an occurrence of leakage in said diagnosis zone based on the pressure detected by said pressure detector, wherein said diagnosis unit obtains a curvature of change curve of said pressure, and wherein, said diagnosis unit compares the pressure in said diagnosis zone with a predetermined pressure once a predetermined time elapses after a point in time at which the pressure starts to change, to determine: (a) an existence of a leak hole having a diameter equal to or above a reference diameter when the pressure in said diagnosis zone does not reach the predetermined pressure; and (b) an existence of a leak hole having a diameter less than the reference diameter, based on a comparison of said curvature of the pressure change curve and a threshold by obtaining said curvature of the pressure change curve, when the pressure in said diagnosis zone reaches the predetermined pressure.

21. A leakage diagnosis method for a fuel vapor purge systems, in which fuel vapor generated in a fuel tank is trapped in a canister via an evaporation passage, and the fuel vapor trapped in said canister is purged, via a purge passage, into an intake passage of an internal combustion engine, comprising the steps of:

blocking a diagnosis zone containing at least one of said fuel tank, said evaporation passage, said canister and said purge passage;

changing a pressure in said blocked diagnosis zone using an external pressure generating source;

detecting the pressure in said diagnosis zone;

calculating a curvature of a change curve of said detected pressure in said diagnosis zone;

measuring an elapsed time after the pressure in said diagnosis zone starts to be changed using said external pressure generating source;

judging whether or not the pressure in said diagnosis zone reaches a predetermined pressure at a point of time when said elapsed time reaches a predetermined time;

judging an existence of a leak hole having a diameter equal to or above a reference diameter, when the pressure in said diagnosis zone does not reach said predetermined pressure;

calculating said curvature of the pressure change curve when the pressure in said diagnosis zone reaches said predetermined pressure; and judging whether or not there exists a leak hole having a diameter less than the reference diameter, based on said curvature of the pressure change curve.

* * * * *